United States Patent [19]

Maruyama

[11] Patent Number: 4,573,783

[45] Date of Patent: Mar. 4, 1986

[54] FOCUSING CONTROLLING DEVICE

[75] Inventor: Takashi Maruyama, Nagano, Japan

[73] Assignee: Chinon Kabushiki Kaisha, Nagano, Japan

[21] Appl. No.: 553,043

[22] Filed: Nov. 18, 1983

[30] Foreign Application Priority Data

Dec. 1, 1982 [JP] Japan .................................. 57-210889

[51] Int. Cl.⁴ ............................................... G03B 3/10
[52] U.S. Cl. ..................................................... 354/403
[58] Field of Search ............... 354/163, 400, 402, 403, 354/404, 405, 406, 407, 408, 409, 165; 356/1; 250/201 AF

[56] References Cited

U.S. PATENT DOCUMENTS 3,906,389  9/1975  Matsumoto et al. ................. 354/403
4,251,145  2/1981  Cocron et al. ...................... 354/409
4,470,681  9/1984  Johnson ............................. 354/403

Primary Examiner—L. T. Hix
Assistant Examiner—David M. Gray
Attorney, Agent, or Firm—Murray, Whisenhunt and Ferguson

[57] ABSTRACT

A focusing control for a camera which uses a reflected beam of light to control extension of the lens. The reflected light beam is received by a photodetector having two aligned photodetectors which are movable with the camera lens. The circuitry controlling the lens movement processes the photo-detector signal by producing integrated sum and differences signals from the two detectors and using these signals to provide indications of the direction and amount of extension of the lens necessary to be in focus. The processor uses comparators, a counter for measuring extension and a memory for remembering the direction of misfocus.

6 Claims, 3 Drawing Figures

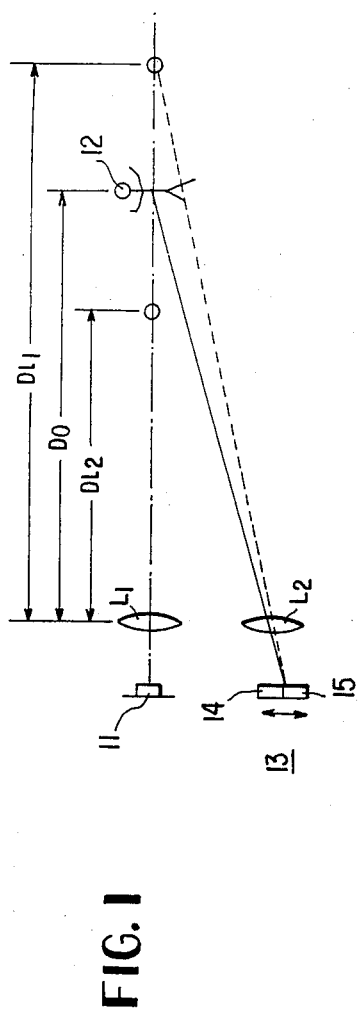
FIG. 2
FIG. 1
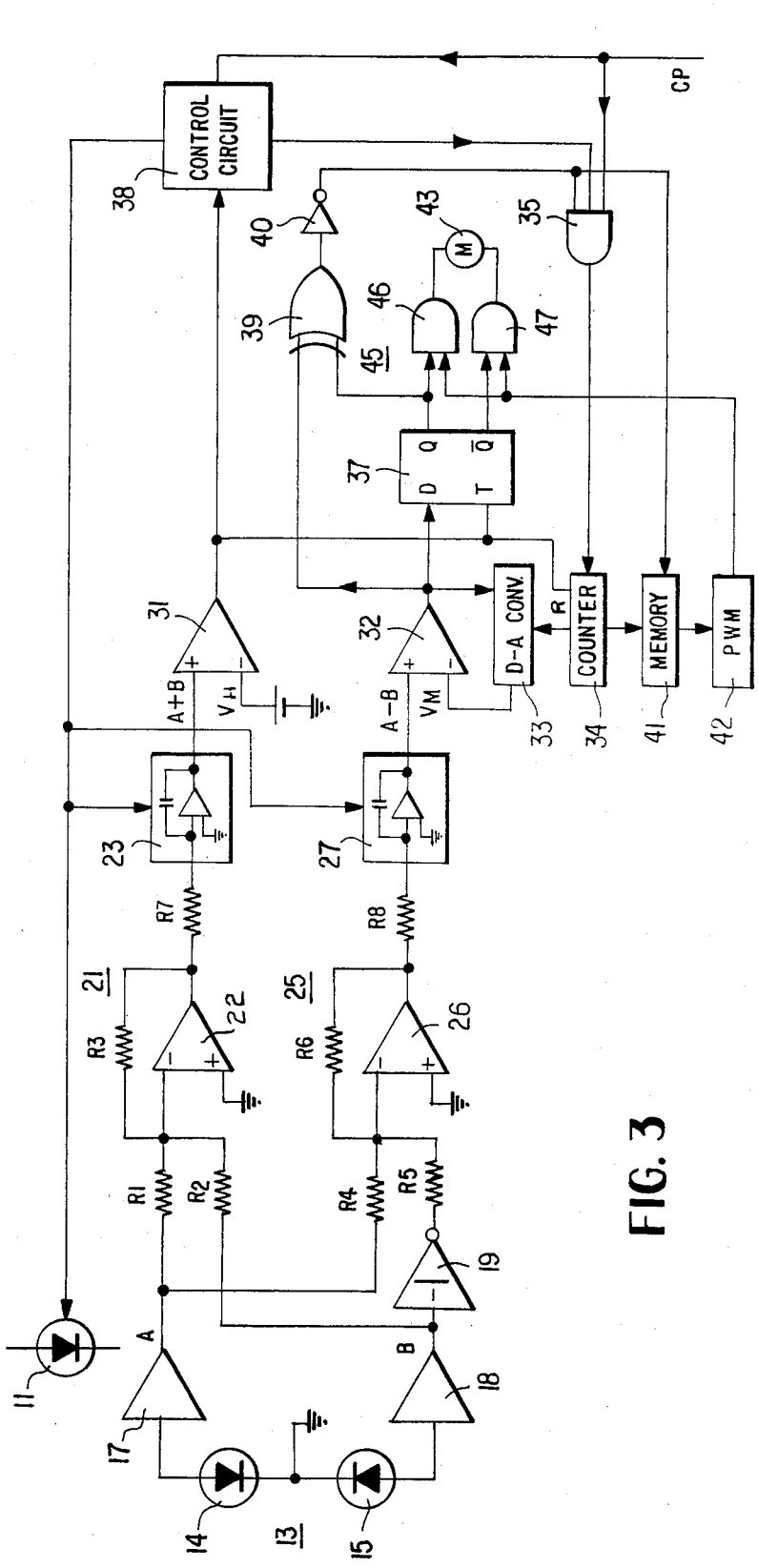
FIG. 3

FOCUSING CONTROLLING DEVICE

BACKGROUND OF THE INVENTION

This invention relates to a focusing controlling device which is used in a camera or the like, to change the amount of extension of the photographing lens according to the position of the object.

A variety of automatic focusing devices have been proposed in the art. One of the automatic focusing devices is an active system. In this system, light is applied from the camera to the object, and light reflected from the object is received to measure the distance between the camera and the object. In a system of this type, a range finding operation is generally carried out according to the principle of triangulation. In the range finding operation, a light beam reflected from the object is applied to a light receiving element which is faced in the same direction as the photographing lens, and the photographable range is scanned with an infrared beam, so that the distance is measured from the angle of the optical axis of the infrared beam applied to the light receiving element. In another example of a conventional automatic focusing device, a number of light receiving elements are arranged in a line, a light beam is applied in the direction of the optical axis of the photographing lens, and the distance is measured by finding the order of the light receiving element to which the light beam is incident. However, the former device suffers from a problem that it is low in durability because it employs the scanning beam operation; while the latter device is disadvantageous in that it is expensive because it uses a number of light receiving elements which are considerably small in size.

OBJECT OF THE INVENTION

An object of the invention is to provide a focusing controlling device which is excellent in durability and is manufactured at low cost because of the employment of a novel construction in which the scanning beam operation and the use of a number of light receiving elements are eliminated, and which needs no automatic control for dealing with an amount of defocusing, the distance between the camera and the object, and the reflection factor of the object, thus being simpler in construction, and which is applicable to both a still camera and a movie camera.

SUMMARY OF THE INVENTION

The foregoing object of the invention has been achieved by the provision of a focusing controlling device which, according to the invention, comprises: a light receiving section in which, in association with the extension of a photographing lens, a first light receiving element receives a larger part of a light beam reflected from an object when the photographing lens is focused on a point in front of the object, and a second light receiving element receives a larger part of the light beam reflected when the photographing lens is focused on a point behind the object; a first comparator for detecting when the integrated value of the sum of the outputs of the first and second light receiving elements reaches a predetermined value; a second comparator for receiving the integrated value of the difference between the outputs of the first and second light receiving elements, to provide an output according to a direction of the difference, comparing the integrated value of the difference with a variable threshold value; and inverting the output when the integrated value of the difference coincides with the variable threshold value; a memory circuit for storing a direction of the integrated value of the difference according to an output of the second comparator; a counter which is reset by a detection signal provided by the first comparators, and counts a clock pulse for a period of time which elapses from the time instant that the counter is reset as described above until the output of the second comparator is inverted; a digital-to-analog converter for changing, according to a count value of the counter, the variable threshold value of the second comparator so as to be coincident with the integration value of the difference; and an operating circuit for providing, according to a final count value of the counter and the direction stored in the memory circuit, a signal representing an amount of extension of the photographing lens and a direction of extension thereof, the counter counting the integrated value of the difference corresponding to the amount of defocusing, to control the amount of extension of the photographing lens.

BRIEF DESCRIPTION OF THE DRAWINGS

FIG. 1 is an explanatory diagram for a description of the principle of this invention according to a triangulation system.

FIG. 2 is an explanatory diagram showing the arrangement of a light receiving section in FIG. 1.

FIG. 3 is a circuit diagram, partly as a block diagram, showing one example of a focusing controlling device according to the invention.

DESCRIPTION OF THE PREFERRED EMBODIMENT

This invention will be described with reference to its preferred embodiment shown in the accompanying drawing.

FIG. 1 shows the principle of this invention. In FIG. 1, reference numeral 11 designates an element such as an infrared beam emitting diode for emitting an infrared beam towards an object 12; and 13, a light receiving section comprising two light receiving elements 14 and 15 which are adjacent to each other to receive light reflected from the object 12. The light receiving section 13 is so designed that it is displaced in a direction perpendicular to the optical axis extended to the object 12 as a photographing lens (not shown) is extended. The lens and section 13 are ganged together. As the lens is focused on a near object by increasing the amount of extension, the distance between the light receiving section 13 and the infrared beam emitting element 11 is increased. As the lens is focused on a distant object by decreasing the amount of extension, the distance is decreased.

In the above-described arrangement, a light beam from the light emitting element 11 is applied through a condenser lens $L_1$ to the object 12, and is then reflected from the object 12. The light beam thus reflected is applied through another condenser lens $L_2$ to the light receiving section 13. When the distance $D_0$ between the lens and the object 12 (hereinafter referred to as "an object distance $D_0$", when applicable) is equal to the distance $D_f$ between the lens and a point on which the photographing lens is focused (hereinafter referred to as "a substance distance $D_f$", when applicable), the reflected beam is equally applied to the two light receiving elements 14 and 15 as indicated at a position C in FIG. 2. When the photographing lens is focused on a point in front of the object ($D_0-D_{l2}>0$), (hereinafter referred to as "front focusing", when applicable), the amount of extension of the photographing lens is large and the light receiving section 13 is shifted downwardly from a predetermined position in FIG. 1, and accordingly the quantity of light incident to the first light receiving element 14 is larger than that to the second light receiving element 15. When the difference is further increased, then the reflected beam is applied only to the first light receiving element 14 as indicated at position A in FIG. 2. When the photographing lens is focused on a point behind the object 12 ($D_0-D_{l1}<0$) (hereinafter referred to as "rear focusing", when applicable), a larger part of the reflected beam is applied to the second light receiving element 15. When the quantity of light applied to the second light receiving element 15 is extremely larger than that applied to the first light receiving element 14, the reflected beam is applied only to the second light receiving element as indicated at position B in FIG. 2. As described above, blocks A, B, and C each represent a possible position of the reflected light beam.

As is apparent from the above description, the position of the reflected beam on the light receiving section 13 changes with the difference between the substance distance $D_l$ and the object distance $D_0$ of the photographing lens as shown in FIG. 2. Therefore, if the quantity of light incident to the right-hand side of the light receiving section is electrically compared with that of light incident to the left-hand side, then it can be detected whether the lens is focused on a point in front of the object or on a point behind the object. As a result, the photographing lens can be moved to a focusing position.

FIG. 3 is a circuit diagram showing one example of focusing controlling device according to the invention. In FIG. 3, the output terminals of the first and second light receiving elements 14 and 15 are connected to current amplifying buffer circuits 17 and 18, respectively. The output terminal of the buffer circuit 18 is connected to an output inverter circuit 19, so that the output B of the second light receiving element 15 supplied through the buffer circuit 18 is inverted. A first amplifier 21 comprises resistors $R_1$, $R_2$ and $R_3$ and an operational amplifier 22. One input terminal of the operational amplifier 22 is connected through the resistor $R_1$ to the output terminal of the buffer circuit 17, and through the resistor $R_2$ to the output terminal of the buffer circuit 18. The output terminal of the operational amplifier is connected through a resistor $R_7$ to a first pulsed integrator 23. The integrated value (A+B) of the sum of the outputs of the first and second light receiving elements 14 and 15 is provided at the output terminal of the integrator 23. A second amplifier 25 comprises resistors $R_4$, $R_5$ and $R_6$ and an operational amplifier 25. One input terminal of the operational amplifier 25 is connected through the resistor $R_4$ to the output terminal of the buffer circuit 17, and through the resistor $R_5$ to the output terminal of the inverter circuit 19. The output terminal of the operational amplifier 26 is connected through a resistor $R_8$ to a second pulsed integrator 27. The integration value (A−B) of the difference between the outputs of the first and second light receiving elements 14 and 15.

A first comparator 31 has one input terminal connected to the output of the first integrator 23, to receive the output of the latter 23, i.e., the integration value (A+B) the sum. The other input terminal of the first comparator 31 is connected to a power source providing a constant threshold value $V_H$. The comparator 31 detects when the integration value (A+B) reaches the threshold value $V_H$, thus providing a detection signal. A second comparator 32 has one input terminal connected to the output of the second integrator 27, to receive the output of the latter 27, i.e., the integration value (A−B) of the difference. The other input terminal of the second comparator 32 is connected to the output terminal of a digital-to-analog converter 33 for providing a variable threshold value $V_M$ (hereinafter referred to as "a D−A converter 33", when applicable). The variable threshold value $V_M$ is zero initially; however, it is increased to be equal to the integrated value (A−B) of the difference as a counter 34, etc., are operated, as described later. The second comparator 32 compares the integrated value (A−B) of the difference with the variable threshold value $V_M$, to provide an output according to the direction (or polarity) of the integrated value (A−B) of the difference. More specifically, when, under the condition of front focusing, the outputs of the first and second light receiving elements 14 and 15 are in a relation (A>B) and the integration value (A−B) of the difference is positive, then the output is at a high logic level (hereinafter referred to merely as "H", when applicable) for an initial period. When the input becomes substantially equal to the variable threshold value $V_M$ ($A-B=V_M$) as the latter changes, the output is set to a low logical level (hereinafter referred to merely as "L", when applicable). In the case of rear focusing, all the above-described states are changed. That is, the output of the second comparator 32 is at "L" for the initial period, and is raised to "H" when $A-B=V_M$.

The counter 34 provides a digital signal on which the variable threshold $V_M$ is based. The reset terminal R of the counter 34 is connected to the output terminal of the first comparator 31, so that the counter 34 is reset by the detection signal outputted by the first comparator 31. The clock terminal of the counter is connected to the output terminal of an AND gate 35. The counter counts a clock pulse CP which is outputted when conditions (described later) are satisfied. The count value (digital signal) of the counter is applied to the D−A converter 33. The D−A converter 33 has an operation polarity changing terminal which is connected to the output terminal of the second comparator 32, so that the operation polarity is changed according to the output ("H" or "L") of the comparator 32. That is, when the output of the second comparator 32 is at "H", the variable threshold value $V_M$ is stepwise increased to the positive side according to the count value. In contrast, when the output of the second comparator 32 is at "L", the variable threshold value $V_M$ is stepwise increased to the negative side.

A memory circuit 37, comprising a D flip-flop circuit, stores the direction of the integrated value (A−B) of the difference which is the output of the second comparator 32. For this purpose, the D terminal of the memory circuit 37 is connected to the output terminal of the memory circuit of the second comparator 32, and the T terminal is connected to the output terminal of the first comparator 31. Therefore, the memory circuit 37, being triggered by the detection signal from the first comparator 31, stores the output ("H" or "L") of the second comparator 32. That is, if, when the memory circuit 37 is triggered as described above, an "H" input is applied to the D terminal, then the Q terminal is raised to "H" while the $\overline{Q}$ terminal is set to "L"; and if, when the memory circuit is triggered, an "L" input is applied to the D terminal, then the Q terminal is set to "L" while the $\overline{Q}$ is raised to "H", and this state is maintained.

A control circuit 38, receiving a clock pulse CP, applies a light emitting instruction to the light emitting element 11 and an integration starting instruction and a releasing instruction to the first and second integrators 23 and 27 with predetermined periods. The control circuit 38 is connected to the output terminal of the first comparator 31. Upon reception of the detection signal from the output terminal of the first comparator 31, the control circuit 38 applies an integration stopping instruction to the first and second integrators 23 and 27 and a defocusing detection start signal to one input terminal of the AND gate 35.

An EXCLUSIVE OR gate 39 has one input terminal connected to the output terminal of the second comparator 32 and the other input terminal connected to the Q terminal of the D flip-flop circuit 37. The output terminal of the EXCLUSIVE OR gate 39 is connected through an inverter 40 to the remaining input terminal of the AND gate 35, to give the AND gate 35 the condition that the input (A−B) to the second comparator 32 is not coincident with the variable threshold value $V_M$.

In addition to the defocusing detection start signal and the non-coincidence condition of the second comparator 32, the clock pulse CP is applied to the AND gate 35. When all of these input conditions are applied to the AND gate 35, the latter 35 is opened to apply the clock pulse to the counter 34. The count value of the counter 34 is applied not only to the D−A converter 33 but also to a memory 41. The memory 41 is connected to the output terminal of the inverter 40. Therefore, the aforementioned non-coincidence condition is inverted (i.e., a coincidence condition is obtained), and the memory 41 stores the count value at that time (or the final count value).

Further in FIG. 3, reference numeral 42 designates a pulse width determining circuit which determines a pulse width for driving a motor 43 according to the final count value stored in the memory 41. The motor 43 is used to move the photographing lens (not shown) to a focusing position. The pulse width corresponds to the amount of extension of the photographing lens.

An operating circuit 45 has two AND gates 46 and 47 for rotating the motor in the forward direction and in the reverse direction. The AND gates 46 and 47 receives the output of the pulse width determining circuit 42, i.e., a signal corresponding to the amount of extension of the photographing lens, and receives signals representing the directions of extension which are provided at the Q terminal and the $\overline{Q}$ terminal of the D flip-flop circuit 37, respectively, so that, when these signals coincide with each other, the motor is turned in the forward direction or in the reverse direction.

When the control circuit 38 causes the light emitting element 11 to emit light, light reflected from the object 12 is applied to the first and second light receiving elements 14 and 15 of the light receiving section 13, where it is subjected to photo-electric conversion. The outputs of the first and second light receiving elements 14 and 15 are applied through the buffer circuits 17 and 18 and the amplifiers 21 and 25 to the integrators 23 and 27, respectively. Accordingly, the integrated value (A+B) of the sum of the outputs of the first and second light receiving elements 14 and 15 is provided at the output terminal of the first integrator 23, while the integrated value (A−B) of the difference of the outputs is provided at the output terminal of the second integrator 27.

It is assumed that the photographing lens (not shown) is in a front focusing state. In this case, the output of the light receiving element 14 is larger than that of the light receiving element 15 (A>B) and the integration value (A−B) of the difference is positive. Therefore, the second comparator 32 produces an "H" output in the initial state ($V_M=0$).

The first comparator 31 detects when the integration value (A+B) of the sum reaches the constant threshold value $V_H$, thus providing the detection signal ("H"). This detection signal is applied to the control circuit 38, as a result of which the first and second integration operations are stopped and the defocusing detection start signal is applied to the AND gate 35. The detection is further applied to the reset terminal R of the counter 34 to reset the latter 34, and to the T terminal of the flip-flop circuit 37 to trigger the latter 37. In this operation, the "H" output from the second comparator being applied to the D terminal of the D flip-flop circuit 37, the Q terminal and the $\overline{Q}$ terminal are maintained at "H" and "L", respectively. That is, the D flip-flop circuit 37 has stored the direction (or polarity) of the integrated value (A−B) of the difference, i.e., a front focusing state or a rear focusing state (the front focusing state being stored because of "H" level).

Owing to the above-described operations, both inputs to the EXCLUSIVE OR gate 39 are at "H". Therefore, the output of the EXCLUSIVE OR gate 39 is at "L". This "L" output is inverted into an "H" signal by the inverter 40. Thus, the non-coincidence condition of the second comparator 32 is given to the AND gate 35. As a result, the AND gate 35 is opened, to apply the clock pulse CP to the counter 34. That is, the counter 34, being reset by the detection signal from the first comparator 31, starts counting the clock pulse which is inputted from this time instant. Basing on the count value, the D−A converter 33 changes the variable threshold value $V_M$ stepwise so that it coincides with the integration value (A−B) of the difference. When ($V_M=A-B$) is obtained as the threshold value $V_M$ changes, the output of the second comparator 32 is changed to "L" from "H". Accordingly, the output of the EXCLUSIVE OR gate 39 is also changed to "H", and the non-coincidence condition applied through the inverter 40 to the AND gate 35 is inverted into "L", thereby to close the AND gate 35. Because of this operation, the counting operation of the counter 34 is stopped, and the signal ("L") which is obtained by inverting the non-coincidence condition is applied to the memory 41, so that the final count value of the counter 34 is stored in the memory 41. The final count value is converted into a pulse width signal corresponding to the amount of extension of the photographing lens in the pulse width determining circuit 42. The pulse width signal is applied to the two AND gates 46 and 47. As the "H" signal is applied to the AND gate 46 from the Q terminal of the D flip-flop circuit 37 which has stored the front focusing state, the signal from the pulse width determining circuit 42 is passed through the AND gate 46, so that the motor 43 is driven as much as the pulse width to move the photographing lens towards the focusing position.

The above-described operation is repeatedly carried out with the timing which is based on the instructions from the control circuit 38 and the first comparator 31, and even during the detection of the integration value (A−B) of the difference the motor 43 is maintained turned according to the contents of the D flip-flop circuit 37 and the pulse width determining circuit 42.

When the reflected light is equally applied to the first and second light receiving elements 14 and 15, i.e., the focusing state is obtained (the photographing lens being at the focusing position), the non-coincidence condition applied to the AND gate 35 from the inverter 40 is maintained at "L", and the AND gate 35 is maintained closed. Therefore, the counter 34 counts no clock pulse CP, and provides no output to the D−A converter 33 and the memory 41 no matter how many times the counter is reset by the output of the first comparator 31. Accordingly, the variable threshold value $V_M$ remains zero; that is, it has a value provided in the focusing state. As the pulse width determining circuit applies no pulse to the AND gates 46 and 47, the motor 43 is stopped, and it is maintained stopped.

The invention has been described with reference to the case of front focusing. In the case of rear focusing, signal levels are opposite to those in the above-described case; for instance the output of the second comparator 32 is at "L" and the operating polarity of the D−A converter 33 is opposite. However, since the fundamental operation in the case of rear focusing is similar to that in the case of front focusing, its detailed description will be omitted.

In the invention, the detection period of the integration value (A−B) of the difference, i.e., the amount of defocusing is determined by the integrated value (A+B) of the sum, and therefore the detection period is constant irrespective of the integrated value (A−B) of the difference. That is, the timing of operation of the entire circuit does not depend on the amount of defocusing, which makes it possible to simplify the control circuit 38.

A light beam reflected from an object is affected by the distance between the camera and the object and the reflection factor of the object. Accordingly, heretofore, it has been necessary to automatically control the amplification factor of a signal from the light receiving element and the amount of light emitted by the light emitting element. However, in the invention, as the integrated value (A−B) of the difference is detected until the integrated value (A+B) of the sum reaches a certain value, the above-described automatic control is eliminated.

One of the features of the invention is that the circuit for detecting the amount of defocusing is one system. That is, in the input stage of the signals from the first and second light receiving elements 14 and 15, the difference of the outputs of these elements 14 and 15 is obtained. The output difference is subjected to decision by one comparator 32 after being amplified. Therefore, if only the light reception output characteristics of the light receiving elements 14 and 15 are made high in accuracy, then the amount of defocusing can be detected with high fidelity. Accordingly, in the focusing controlling device, unlike the conventional one, it is unnecessary that the two amplifier circuits for the light receiving elements be matched with each other in characteristics, and the circuit can be greatly simplified.

ADVANTAGES OF THE INVENTION

As is apparent from the above description, the focusing controlling device of the invention, unlike the conventional one, employs no scanning beam operation and uses few light receiving elements. Therefore, the device is excellent in durability and can be manufactured at low cost. Furthermore, the device can positively perform the focusing control independently of the amount of defocusing, the distance between the camera and the object, and the reflection factor of the object. Therefore, it is unnecessary for the device to have automatic control circuits for dealing with these factors. Thus, the device is very simple in construction and arrangement.

What is claimed is:

1. A focusing controlling device comprising:
   a light receiving section in which, in association with the extension of a photographing lens, a first light receiving element receives a larger part of a light beam reflected from an object when said photographing lens is focused on a point in front of said object, and a second light receiving element receives a larger part of said light beam reflected when said photographing lens is focused on a point behind said object;
   a first comparator for detecting when the integrated value of the sum of outputs of said first and second light receiving elements reaches a predetermined value;
   a second comparator for receiving the integrated value of the difference between the outputs of said first and second light receiving elements, to provide an output according to the direction of said difference, comparing the integrated value of the difference with a variable threshold value, and inverting said output when the integrated value of the difference coincides with said variable threshold value;
   a memory circuit for storing said direction of the integrated value of said difference as determined by the output of said second comparator;
   a counter which is reset by a detection signal provided by said first comparator, and counts a clock pulse for a period of time which elapses from the time instant that said counter is reset by said detection signal until the output of said second comparator is inverted;
   a digital-to-analog converter for changing, according to the count value of said counter, the variable threshold value of said second comparator so as to be coincident with the integrated value of said difference; and
   an operating circuit for providing, according to a final count value of said counter and said direction stored in said memory circuit, a signal representing an amount of extension of said photographing lens and a direction of extension thereof.

2. A focusing controlling system for a camera which comprises:
   a. a stationary light emitting element which sends a beam of light to an object in the field of view of the camera to be reflected thereby;
   b. a movable light receiving element for receiving the reflected beam of light with said receiving element being ganged together with the camera lens for movement therewith, so that said light receiving element moves on a line perpendicular to the optical axis of the camera when the camera lens is extended along the optical axis;

c. said light receiving element comprising two aligned, adjacent photodetectors A & B;

d. said light receiving element and the camera lens are so adjusted that when the camera is in focus the light beam reflected from said object will impinge equally on the photo detectors A & B, and when the focal point is in front of the object A will receive more light than B, and vice versa when the focal point is behind the object;

e. a processing circuit for the reflected light signals which comprises:
 1. an adder for signals received by A & B providing the sum signal A+B;
 2. a subtractor for signals received by A & B providing the difference signal A−B;
 3. first and second pulsed integrators which provide integrated sum signals and integrated difference signals, respectively;
 4. said integrated sum and difference signals providing inputs to a control circuit which controls the direction and amount of movement of a motor which moves the camera lens and the light receiving element, said movement continuing until the received signals A & B are equal, at which time the camera will be in focus.

3. A focusing controlling system as in claim 2 wherein said processing system further comprises:
 a. a first comparator which compares the integrated A+B signal with a predetermined value;
 b. a second comparator which compares the integrated A−B signal with a variable threshold;
 c. a counter with pulses applied thereto for for counting, a reset signal which is provided by the output of the first comparator, and an output which represents the variable threshold for the second comparator;
 d. said counter continuing to count pulses until the variable threshold equals the integrated A−B signal, the count at this time representing the amount of extension of the camera lens.

4. A focusing controlling system as in claim 2, wherein said light receiving element consists of two aligned, adjacent photodetectors A and B.

5. A focusing controlling system for a camera which comprises:
 a. a stationary light emitting element which sends a beam of light to an object in the field of view of the camera to be reflected thereby;
 b. a movable light receiving element for receiving the reflected beam of light with said receiving element being ganged together with the camera lens for movement therewith, so that said light receiving element moves on a line perpendicular to the optical axis of the camera when the camera lens is extended along the optical axis;
 c. said light receiving element comprising two aligned, adjacent photodetectors A and B;
 d. said light receiving element and the camera lens are so adjusted that when the camera is in focus the light beam reflected from said object will impinge equally on the photo detectors A and B, and when the focal point is in front of the object, A will receive more light than B, and vice versa when the focal point is behind the object;
 e. a processing circuit for the reflected light signals which comprises:
  1. an adder for signals received by A and B providing the sum signal A+B;
  2. a subtractor for signals received by A and B providing the difference signal A−B;
  3. first and second pulsed integrators which provide integrated sum signals and integrated difference signals, respectively;
  4. said integrated sum and difference signals providing inputs to a control circuit which controls the direction and amount of movement of a motor which moves the camera lens and the light receiving element, said movement continuing until the received signals A and B are equal, at which time the camera will be in focus, said control circuit comprising a first comparator which compares the integrated A+B signal with a predetermined value; a second comparator which compares the integrated A−B signal with a variable threshold; a counter with pulses applied thereto for counting, a reset signal which is provided by the output of the first comparator, and an output which represents the variable threshold for the second comparator; said counter continuing to count pulses until the variable threshold equals the integrated A−B signal, the count at this time representing the amount of extension of the camera lens.

6. A focusing controlling device for a camera which comprises:
 a light emitting element which sends a beam of light to an object in the field of view of the camera to be reflected thereby;
 a light receiving section in which, in association with the extension of a photographing lens, a first light receiving element receives a larger part of a light beam reflected from an object when said photographing lens is focused on a point in front of said object, and a second light receiving element receives a larger part of said light beam reflected when said photographing lens is focused on a point behind said object;
 a first comparator for detecting when the integrated value of the sum of the outputs of said first and second light receiving elements reaches a predetermined value;
 a second comparator for receiving the integrated value of the difference between the outputs of said first and second light receiving elements, to provide an output according to the direction of said difference, comparing the integrated value of the difference with a variable threshold value, and inverting said output when the integrated value of the difference coincides with said variable threshold value;
 a counter which is reset by a detection signal provided by said first comparator, and counts a clock pulse for a period of time which elapses from the time instant that said counter is reset by said detection signal until the output of said second comparator is inverted;
 a digital-to-analog converter for changing, according to the count value of said counter, the variable threshold value of said second comparator so as to be coincident with the integrated value of said difference; and
 a control circuit, triggered by a detection signal provided by said first comparator, which controls the integration of said sum and difference of the outputs of said first and second light receiving elements and the direction and amount of movement of a motor which moves the camera lens, said movement continuing until the signals received from the first and second light receiving elements are equal, at which time the camera will be in focus.

* * * * *